United States Patent
Schneider et al.

(10) Patent No.: US 7,572,854 B2
(45) Date of Patent: Aug. 11, 2009

(54) DISPERSION OF ALUMINIUM OXIDE

(75) Inventors: Gerrit Schneider, Hanau (DE); Heinz Lach, Gelnhausen (DE); Thomas Scharfe, Alzenau (DE)

(73) Assignee: Degussa AG, Fed Rep (DE)

( * ) Notice: Subject to any disclaimer, the term of this patent is extended or adjusted under 35 U.S.C. 154(b) by 0 days.

(21) Appl. No.: 10/277,130

(22) Filed: Oct. 22, 2002

(65) Prior Publication Data

US 2003/0124321 A1    Jul. 3, 2003

(30) Foreign Application Priority Data

Oct. 25, 2001   (DE) ................... 101 52 745

(51) Int. Cl.
*C08K 3/18*     (2006.01)
*D06M 15/263*   (2006.01)

(52) U.S. Cl. ................. 524/430; 252/8.62

(58) Field of Classification Search ........ 524/430, 524/437, 557; 423/111; 252/8.62
See application file for complete search history.

(56) References Cited

U.S. PATENT DOCUMENTS

| | | | | |
|---|---|---|---|---|
| 4,224,419 A * | 9/1980 | Swoboda et al. ............ 525/71 |
| 5,635,291 A | 6/1997 | Yoshino et al. |
| 6,197,073 B1 | 3/2001 | Kadner et al. |
| 6,268,424 B1 | 7/2001 | Blume et al. |
| 6,284,819 B1 * | 9/2001 | Darsillo et al. ............ 524/22 |
| 6,680,109 B1 * | 1/2004 | Plambeck-Fischer et al. ............ 428/323 |
| 6,743,269 B2 * | 6/2004 | Meyer et al. ............ 51/309 |
| 2002/0121156 A1 * | 9/2002 | Menzel et al. ............ 75/255 |
| 2002/0155222 A1 * | 10/2002 | Caron ............ 427/299 |
| 2002/0182380 A1 * | 12/2002 | Nagashima et al. ............ 428/195 |
| 2003/0140657 A1 * | 7/2003 | Oswald et al. ............ 65/391 |

FOREIGN PATENT DOCUMENTS

| | | |
|---|---|---|
| CA | 2317692 | 3/2001 |
| EP | 0 732 219 A3 | 9/1996 |
| EP | 0 732 219 B1 | 9/1996 |
| EP | 0732219 A3 | 9/1996 |
| EP | 0732219 B1 | 5/2000 |
| JP | 1997024666 A | 1/1997 |
| JP | 1999020304 A | 1/1999 |

\* cited by examiner

*Primary Examiner*—Glenn Caldarola
*Assistant Examiner*—Jim Goloboy
(74) *Attorney, Agent, or Firm*—Smith, Gambrell & Russell, LLP

(57) ABSTRACT

Aqueous dispersions of a pyrogenically-produced aluminum oxide are prepared form a mixture containing water, additives and a high-surface-area pyrogenically-produced aluminum oxide with a BET specific surface area of more than 115 $m^2/g$ and a Sears number of more than 8 ml/2 g using controlled high shearing conditions. Prior to subjecting the mixture to high shear conditions, the pH of the mixture is adjusted to a value between of 2 to 11 (preferably 3 to 8). The aqueous dispersion has a mean particle size distribution of $d_{50}<150$ nm. These dispersions are useful in the production of Inkjet media, digital imaging products and other printing media and result in high color densities, photo-realistic reproductions and particularly good print and gloss quality.

3 Claims, 3 Drawing Sheets

VP W520 "F", measured on 11.01.01
Shearing tests

| Memory no. | Graphic type | File no. | Material | Average value |
|---|---|---|---|---|
| Memory 1 | | 0 min | AluVP130 | 0.1489 ($\mu$m) |
| Memory 2 | | 15 min | AluVP130 | 0.1529 ($\mu$m) |
| Memory 3 | | 27 min | AluVP130 | 0.1323 ($\mu$m) |
| Memory 4 | | 30 min | AluVP130 | 0.1234 ($\mu$m) |
| Memory 5 | | 45 min | AluVP130 | 0.1334 ($\mu$m) |
| Memory 6 | | 60 min | AluVP130 | 0.1174 ($\mu$m) |

Changes in the viscosity of W 520 "F" with increasing shearing time

DISPERSION OF ALUMINIUM OXIDE

RELATED APPLICATIONS

This application claims priority to European Patent Application No. 101 52 745.4 filed Oct. 25, 2001.

BACKGROUND OF THE INVENTION

Technical Field

The invention relates to a dispersion of pyrogenically-produced aluminium oxide, a process for its production and its use.

DISCLOSURE OF THE INVENTION

The invention provides a dispersion, which is characterised in that it contains a high-surface-area, pyrogenically-produced aluminium oxide, which has a BET specific surface area of more than 115 m$^2$/g and a Sears number of more than 8 ml/2 g.

In one embodiment of the invention, the aluminium oxide can be chracterised in that the dibutylphthalate absorption of the powder, measured on a 16 g portion, is not measurable (no end-point detection).

The pyrogenically-produced aluminium oxide that can be used according to the invention, can be produced by the flame oxidation, or preferably flame hydrolysis, method, an evaporable aluminium compound, preferably the chloride, being used as the starting material.

The content of aluminium oxide can be 25±15 wt. %.

The dispersion may contain the following additional constituents:

Organic or inorganic acids or bases, salts, additives such as ionic or non-ionic surfactants, polymers, polyelectrolytes or biocides as well as other auxiliary substances to stabilise the dispersion or to increase its quality or storage stability.

The dispersion according to the invention may also contain, in addition to aluminium oxide, inorganic acids (such as phosphoric acid, nitric acid, sulfuric acid, . . . ), organic acids (such as formic acid, acetic acid, propionic acid, oxalic acid, malonic acid, . . . ), inorganic or organic bases (such as potassium hydroxide, organic amines, . . . ), salts, (such as sodium chloride, potassium formate, calcium nitrate), buffer systems (such as for example potassium dihydrogenphosphate/phosphoric acid buffer, acetic acid/sodium acetate buffer, . . . ) ionic, or non-ionic surfactants, polyelectrolytes, polymers or other dispersing agents or stabilisers, and also biocides.

The invention further provides a process for the production of the dispersion according to the invention, which is characterised in that a high-surface-area, pyrogenically-produced aluminium oxide, which has a BET specific surface area of more than 115 m$^2$/g and a Sears number of more than 8 ml/2 g, is mixed with water, a pH value of 2 to 11, preferably 3 to 8, in particular 2 to 8, is set and the mixture is dispersed by the introduction of shearing forces.

The invention is formed by mixing a high-surface-area, pyrogenically-produced aluminum oxide, which has a BET specific surface area of more than 115 m$^2$/g and a Sears number of more than 8 ml/2 g, with water and additives setting a pH value of 2 to 11 (preferably 3 to 8), and dispersing the mixture by the introduction of controlled shearing forces. To disperse the high-surface-area, pyrogenically-produced aluminium oxide, shearing equipment such as rotor-stator-type machines (batch- or continuous in-line machines), ball mills, pearl mills, agitated ball mills or high-energy shearing processes (in which the dispersion is dispersed under high pressure at pressures of over 1000 bar) is used and the dispersions obtained have a mean particle size distribution of $d_{50}$<150 nm ($d_{50}$ less than 150 nm; measured by dynamic light scattering).

The dispersion according to the invention has the following advantages:

high cationic charge on the surface of the particles, as compared with dispersions produced from aluminium oxides (-oxide hydroxides) by the wet chemical method particle size distributions of the dispersion can be set in a defined way, in contrast to dispersions of other pyrogenic aluminium oxides or aluminium oxides (-oxide hydroxides) produced by the wet chemical method, which are produced by different dispersion processes high dispersion purity, as compared with dispersions produced with aluminium oxides (-oxide hydroxides) produced by the wet chemical method precisely-controllable electrolyte level within the dispersion, as compared with dispersions of other pyrogenic aluminium oxides or aluminium oxides (-oxide hydroxides) produced by the wet chemical method, the electrolyte concentration of which cannot be set precisely as a result of the starting powder or the dispersion process very high surface area of the pyrogenic aluminium oxide as compared with dispersions of other pyrogenic aluminium oxides or aluminium oxides (-oxide hydroxides) produced by the wet chemical method highly distinctive "structure/crosslinking" of the aluminium oxide primary particles within the dispersion, as compared with dispersions of other pyrogenic aluminium oxides or aluminium oxides (-oxide hydroxides) produced by the wet chemical method a high degree of hardness and abrasion resistance of the particles distributed in the dispersion, as compared with dispersions of aluminium oxides (-oxide hydroxides) produced by the wet chemical method, in which the primary particles are less hard.

The dispersion according to the invention is eminently suitable for further processing in Inkjet coating pigments. The invention further relates to a process for the production of Inkjet coating pigments that have been produced with the dispersions according to the invention and the glossy media produced from them. These media are characterised by a very high gloss value, very high colour densities when printing, large colour space, extremely low drying times, a high absorption capacity and (in comparison with other aluminium oxides) increased water resistance, all of which are desirable characteristics.

The following examples demonstrate that the dispersion according to the invention is superior to known dispersions with regard to its processability in a coating pigment and in the associated Inkjet medium.

The recipes used for Inkjet coating pigments are guide recipes. Thus binders other than polyvinylalcohol (with various saponification grades) can be used in combination or alone, such as for example polyvinylpyrrolidone, polyvinylacetate, silanised polyvinylalcohols, styrene-acrylate lattices, styrene-butadiene lattices, melamine resins, ethylenevinylacetate copolymers, vinylpyrrolidone-dimethylaminopropylenemethacrylamide copolymers, polyurethane resins, synthetic resins such as polymethylmethacrylates, polyester resins (for example unsaturated polyester resins), polyacrylates, modified starch, casein, gelatines, cellulose derivatives (for example carboxymethylcellulose) and also in other quantity ratios to the pyrogenic aluminium oxide than those stated in the application example.

The coating according to the invention may also contain, in addition to the dispersion according to the invention, one or more other pigments, and/or dispersions. These may be: calcium carbonates, layered silicates, aluminium silicates, plastic pigments (for example polystyrene, polyethylene, polypropylene), silicas (for example colloidal silicas, precipitated silicas, silica gels, pyrogenic silicas, pyrogenic mixed oxides), cationised variants of the stated silica compounds, aluminium compounds (for example aluminium sols, colloidal aluminium oxides and their hydroxy compounds, such as pseudo-boehmite, boehmite, aluminium hydroxide), magnesium oxide, zinc oxide, zirconium oxide, magnesium carbonate, kaolin, clay, talc, calcium sulfate, zinc carbonate, satin white, lithopones, zeolites or dispersions of these compounds.

Both the solid content of the dispersion and also that of the coating pigment can be varied in comparison with the application examples. Further possible variations consist in changing the pH value, the dispersion method, the composition of the coating pigment formulation and the dispersion medium.

To increase the water-resistance of the binder system and thus the coating, crosslinkers may be used, such as: zirconium oxides, boric acid, melamine resins, glyoxal and isocyanates and other molecules that bind the molecule chains of the binder system with each other.

Furthermore, auxiliary agents such as optical brighteners, de-foaming agents, wetting agents, pH buffers, UV absorbers and viscosity improvers can also be used.

Examples of cationic substances for the cationising of the binder are: polyethyleneimine, polyallylamines, polyvinylamines, polymers consisting of cationic monomers such as primary, secondary and tertiary amines, which are located on the side-chains, and quarternary ammonium compounds.

The coating structure of the medium may also differ from the application examples, in that the coating may consist of several coating layers of the same type or other layers, and the coating that has been produced with the dispersion according to the invention is only located in one of the layers present. Thus, for example, further ink-absorptive coatings (for example precipitated silica coatings) may be applied under the Inkjet coating according to the invention. Furthermore, one or more polymer layers (e.g. polyethylene) can be applied to the substrate and/or to the coating according to the invention, in order to increase the mechanical stability and/or gloss of the coating (for example photographic base paper, lamination). Even if the Inkjet medium contains one or more of the layers described above, and is provided with the coating according to the invention, printability is improved for the majority of printing applications.

The coating pigment recipe can be applied to a substrate by all conventional application processes (alone or in combination). Conventional processes (which are not, however, restricted to the stated processes) are: rolling, blade application, airbrushing, doctor blade (profiled, smooth, split), the cast-coating process, film pressing, bonding-pressing, blade coating, curtain-coating and slot-die application (for example coating blade). The processes allowing extremely homogeneous coating, for example cast-coating, curtain-coating and slot-die application, are preferred.

The coated substrate can be dried by all of the conventional processes (alone or in combination). Conventional processes (which, however, are not restricted to the stated processes) are: air- or convection drying (for example hot air channel), contact- or conduction drying, energy radiation drying (for example infra-red and microwave).

The invention further provides coatings, which have an aluminium oxide-binder weight ratio of 8:1 to 1:2. The coatings can be used for the production of Inkjet-media, digital imaging products and other printing media.

The invention further provides recording media consisting of aluminium oxide dispersions, which are characterised in that they consist of substrates with glossy coatings, in which the coatings contain VP Alu 130 dispersions and dispersion additives (such as acids, bases, surfactants, polymers, polyelectrolytes etc.) and a binder system, the aluminium oxide particles that build up the coating originating from a dispersion according to the invention, with an average particle size of $d_{50}<200$ nm ($d_{50}$ less than 200 nm; measured by dynamic light scattering).

The aluminium oxide dispersion can be used in coatings for materials such as paper, metals, glass, ceramics, plastics, polymers, rubbers and textiles. Furthermore, it can be used to polish or clean metals, semi-conductor elements in the electronics industry, glass, ceramics and other hard materials.

The coatings that have been produced from coating pigments, may have a solid matter content of 15%, and preferably of 18% and more.

The coatings may have a substrate with a substance weight of 80 to 250 g/m². The substrate may have a $Cobb_{10}$ value of 0 to 60.

A water-impermeable sealing coat may be applied to the substrate. The substrate may be a polymer film.

The coatings may be used for the production of Inkjet media (such as paper, films, textiles, . . . ), digital imaging products and other printing media.

The dispersions according to the invention may be used for the coating of fluorescent tubes, lightbulbs or other light sources.

DETAILED DESCRIPTION OF THE INVENTION

EXAMPLE 1

Production of the Aluminium Oxide that can be used According to the Invention 320 kg/h previously-evaporated aluminium trichloride ($AlCl_3$) is burned together with 100 Nm³/h hydrogen and 450 Nm³/h air in a burner of known construction.

After the flame reaction, the fine-particle, high-surface-area aluminium oxide is separated from the hydrochloric acid gases that have also formed, in a filter or cyclone, any HCl traces still adhering being then removed by treatment with moistened air at increased temperature.

The high-surface-area pyrogenic aluminium oxide formed has the physical/chemical reference data shown in Table 1. The data for the pyrogenic aluminium oxide that can be obtained commercially from Degussa-Hüls AG/Frankfurt (commercial name Aluminiumoxid C) are also included in Table 1 for reference.

TABLE 1

| | Unit | High-surface-area aluminium oxide according to the invention Alu 130 | Aluminium oxide C |
|---|---|---|---|
| BET Specific Surface area | $m^2/g$ | 121 | 100 |
| Sears number (pH 4 to 9) | ml/2 g | 9.38 | 7.05 |
| PH | 4% aqueous dispersion | 4.93 | 4.5 |
| Drying loss | wt. % | 3.3 | 3.0 |
| Bulk density | g/l | 55 | 48 |
| Tamped density | g/l | 63 | 57 |
| DBP-Absorption | wt. % | Not measurable, no detectable end point. | 231 |

DBP: Dibutylphthalate

The measurement of the Sears number is disclosed in EP 0 717 008.

EXAMPLE 2

Production of the Dispersion According to the Invention

First, 280 litres de-ionised water are brought to pH 3.9 with a propionic acid in a receiving vessel. 80 kg of the powder described in example 1 with a surface area greater than 115 m2/ g (equivalent to 20 wt.-% aluminium oxide) are then introduced into the water with a rotor-stator machine. After incorporating the whole quantity of the powder, the suspension obtained is intensively sheared for ca. 60 minutes.

Whilst the powder is being introduced, the pH value is maintained at pH=4.0 to 4.1 by adding 18 litres of semi-concentrated acid. After intake of the aluminium oxide and immediately before shearing, a sample of the suspension is taken and a $d_{50}$ value of $d_{50}$=160 nm is determined (measurement in dilution by means of dynamic light scattering). The subsequent shearing process is carried out with the rotor-stator machine at maximum shear energy and lasts for a total of 60 minutes.

After completion of the shearing process, the pH value is 4.1. After adding 2 kg of a biocide, the pH value was brought to the final pH of 3.9 with a further 6 litres of propionic acid. Once production of the dispersion is complete, the liquid volume is increased to 400 litres by adding 14 litres distilled water. The particle size set after the shearing process is $d_{50}$=130 nm.

Figure 1:
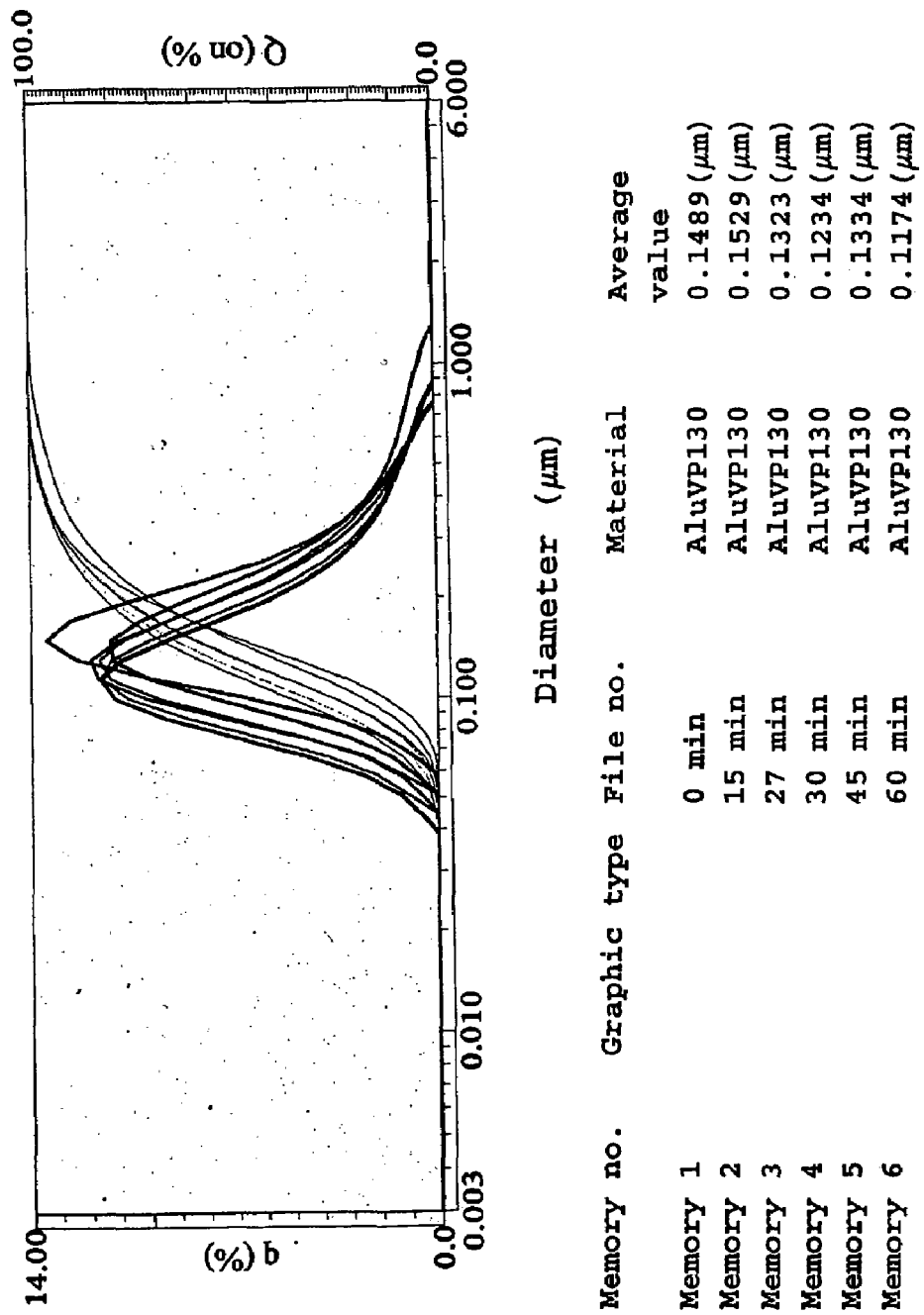
FIG. 1 shows VP W 520 "F" shearing tests measured on Jan. 11, 2001.
Figure 2:
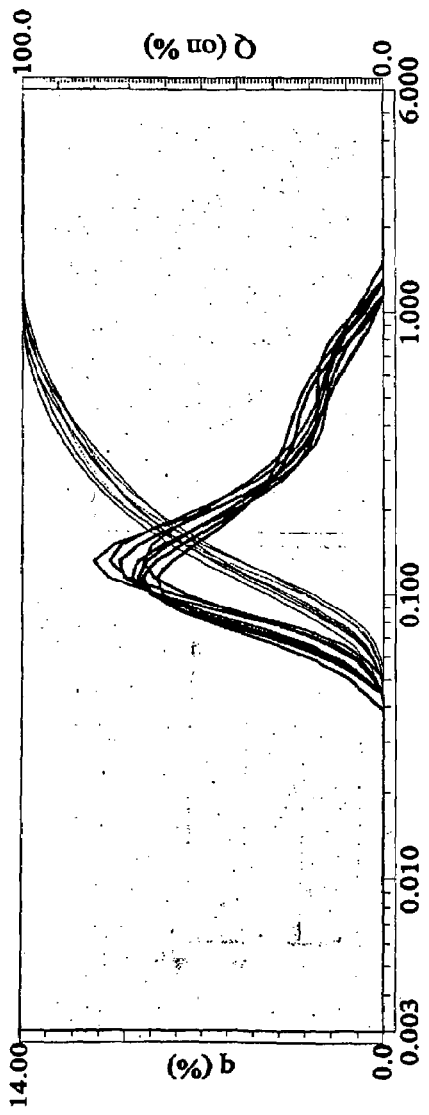
FIG. 2 shows VP W 520 "F" shearing tests measured on Jan. 25, 2001.
Figure 3:
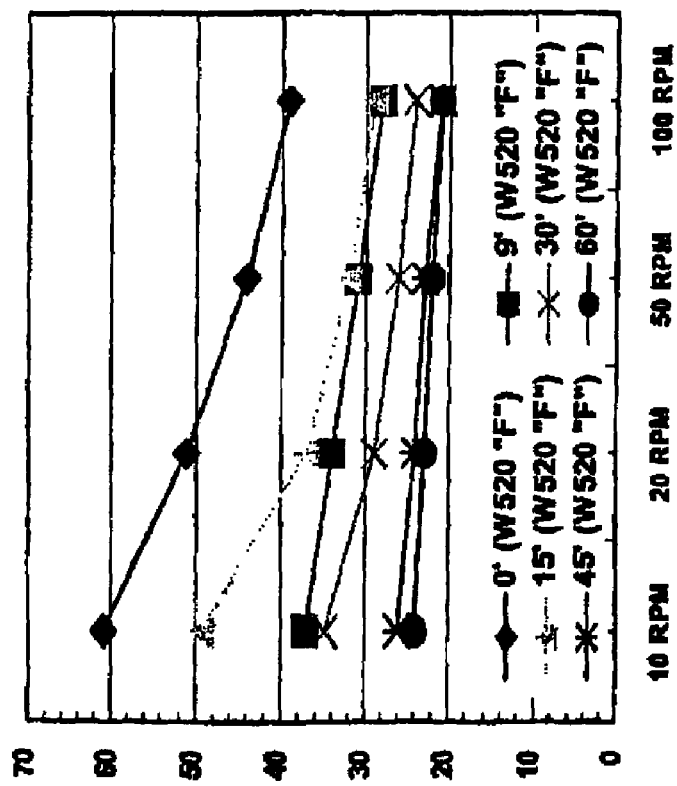
FIG. 3 shows changes in the viscosity of W 520 "F" with increasing shearing time.

Properties of the dispersion according to example 2 of the invention (VP W 520). During production of the dispersion the average particle size falls significantly as the shearing time continues (cf. FIG. 1): without shearing (0 min) the value is still $d_{50}$=160 nm, but after 60 minutes' shearing it falls to $d_{50}$=130 nm:

TABLE 2

Comparison of the samples of the dispersion according to the invention immediately after production and two weeks later

| | 0 min Shear. | 15 min Shear. | 27 min Shear. | 30 min Shear. | 45 min Shear. | 60 min Shear. |
|---|---|---|---|---|---|---|
| $d_{50}$ in (nm) (day of production) | 160 | 155 | 149 | 143 | 137 | 130 |
| $d_{50}$ in (nm) (control, 2 weeks) | 170 | 155 | 153 | 147 | 139 | 136 |

During production of the dispersion according to the invention, the pH value does not depend on the shearing time (cf. Table 2). The change in pH within two weeks is also the same for all samples:

TABLE 3 pH-values of the samples of the dispersion according to the invention (dependency on shearing and time)

| | 0 min Shear. | 9 min Shear. | 15 min Shear. | 30 min Shear. | 45 min Shear. | 60 min Shear. |
|---|---|---|---|---|---|---|
| pH-value (production) | 3.9 | 4.0 | 4.0 | 4.1 | 4.0 | 3.9 |
| pH-value (control, 2 Weeks) | 4.5 | 4.5 | 4.6 | 4.6 | 4.5 | 4.5 |

The gloss values are measured with a Byk-Gardner gloss meter using test card 2855 (black spectrum) as a basis.

The printing properties of the coating are evaluated by printing out a test image on the coating, using an HP 550 C printer and an Epson Stylus Colour 800 printer respectively and having these printed coatings evaluated by 3 independent persons on the basis of the attached scale of marks.

The colour densities are measured on the basis of the test image, which also contains full-area colours (black, magenta, cyan, yellow) using a GretagMacbeth (trademark) Spectro-Eye at an observation angle of 2° and a D50 light source.

EXAMPLE 3

Production of an Inkjet Coating

Educts: aluminium oxide dispersion according to example 2 polyvinyl alcohol Mowiol 40-88 (Clariant, D) polyester film Recipe and method for the production of Inkjet coating pigments:

The aqueous polyvinyl alcohol solution (Mowiol 40-88, Clariant) with 12.14% solid content, is placed in a 400 ml beaker and a quantity of water is added to it, so that, together with the aluminium oxide dispersions according to example 2, a solid content of 18% is obtained. The relevant dispersion is slowly dropped into the polyvinyl alcohol solution using a pipette, within 5 minutes, whilst stirring at 500 rpm. Once it has been added, stirring continues for a further 30 minutes at 500 rpm to obtain a homogenous coating pigment. The coating pigments are then de-aerated using a dessicator and water-jet pump. As a control, the actual solid matter, pH value and viscosity are measured after mixing the coating pigments.

The parts in the table below are understood to mean parts by weight in relation to the solid matter.

TABLE 4

Coating pigment reference values

| | | | |
|---|---|---|---|
| Aluminium oxide dispersion, acc. to example 2, 15 minutes' dispersion time | 100 parts | | |
| Aluminium oxide dispersion, acc. to example 2, 30 minutes' dispersion time | | 100 parts | |
| Aluminium oxide dispersion, acc. to example 2, 60 minutes' dispersion time | | | 100 parts |
| PVA 40-88 | 20 parts | 20 parts | 20 parts |
| Actual solid content of the coating pigments in % | 18.03 | 18.01 | 18.00 |
| PH value | 4.7 | 4.6 | 4.6 |
| Viscosity, Brookfield in mPa s after 24 h | | | |
| After stirring 5 rpm | 920 | 824 | 748 |
| 10 rpm | 840 | 716 | 664 |
| 20 rpm | 715 | 608 | 534 |
| 50 rpm | 560 | 512 | 462 |
| 100 rpm | 463 | 398 | 346 |
| Comments on production of coating pigments | good | good | good |

The viscosity data obtained show that the dispersion according to example 2, and the longest dispersion time, produce the lowest viscosities. This is desirable as the solid matter in the coating pigment can still be increased without obtaining viscosities that are too high to be applied.

Method for the production of an Inkjet coating from the Inkjet coating pigment referred to above A 100 micron thick, un-treated polyester film is coated using an Erichsen Film Applicator device with a 120 micron wet film spiral applicator. The coating pigment applied is dried using a hot air dryer.

Data for the Coatings Obtained:

| | | | |
|---|---|---|---|
| Aluminium oxide dispersion acc. To example 2, 15 minutes' dispersion time | 100 parts | | |
| Aluminium oxide dispersion acc. to example 2, 30 minutes' dispersion time | | 100 parts | |
| Aluminium oxide dispersion acc. to example 2, 60 minutes' dispersion time | | | 100 parts |
| PVA 40-88 | 20 parts | 20 parts | 20 parts |
| Application behaviour | good | good | good |
| Average application weight in g/m² and standard deviation* | 26.1 s = 0.4 | 25.9 s = 0.2 | 26.2 s = 0.3 |

Coating properties

| | | | |
|---|---|---|---|
| Aluminium oxide dispersion acc. to example 2, 15 minutes' dispersion time | 100 parts | | |
| Aluminium oxide dispersion acc. to example 2, 30 minutes' dispersion time | | 100 parts | |
| Aluminium oxide dispersion acc. to example 2, 60 minutes' dispersion time | | | 100 parts |
| PVA 40-88 | 20 parts | 20 parts | 20 parts |
| Adhesion, surface and smoothness of the coating | Good adhesion to the film, homogeneous surface | Very good adhesion to the film, homogeneous surface | Very good adhesion to the film, homogeneous surface |
| Gloss at 20°/ standard deviation at n = 5 | 24.6 s = 0.4 | 26.3 s = 0.1 | 28.8 s = 0.3 |
| Gloss at 60°/ standard deviation at n = 5 | 46.3 s = 0.2 | 49.7 s = 0.3 | 54.7 s = 0.3 |

*Note:
the printing test is carried out with coatings of virtually the same coating weight.

Discussion of the Gloss Values

It can clearly be seen from the gloss values, that the dispersion according to the invention produces higher gloss values in the Inkjet coating after 60 minutes' dispersion time, than the dispersions produced by other methods. With photo-realistic coatings, a high gloss is desirable, as already disclosed in EP 0 732 219. The gloss values are lower than those in EP 0 732 219, but this is due to the different processes for the production of the Inkjet medium and not to the coating pigment. A spiral applicator is consiously used in this test to determine the contribution of the dispersion in the Inkjet coating to the gloss. With the cast-coating process in EP 0 732 219, the gloss is primarily determined by the process itself.

Printing test (determined by 3 independent persons) Top mark: 0.75 bottom mark: 6

| Dispersion used | | Aluminium oxide dispersion acc. to example 2, 15 minutes' dispersion time | Aluminium oxide dispersion acc. to example 2, 30 minutes' dispersion time | Aluminium oxide dispersion acc. to example 2, 60 minutes' dispersion time |
|---|---|---|---|---|
| | | Four colour print Hewlett-Packard 550 C | | |
| Colour intensity | Magenta/ Yellow/Cyan | 1.25 | 1 | 1 |
| | Black | 1 | 1 | 1 |
| dot sharpness | Black in colour | 1.5 | 1.25 | 1.25 |
| transitions | Colour to colour | 1 | 1 | 1 |

-continued

| Dispersion used | | Aluminium oxide dispersion acc. to example 2, 15 minutes' dispersion time | Aluminium oxide dispersion acc. to example 2, 30 minutes' dispersion time | Aluminium oxide dispersion acc. to example 2, 60 minutes' dispersion time |
|---|---|---|---|---|
| | Black to colour | 1.25 | 1 | 1 |
| Contours | | 1 | 1 | 1 |
| Print | | 1.25 | 1.25 | 1 |
| Halftone | | 1 | 1 | 1 |
| Photo quality | | 1.25 | 1.25 | 1 |
| Total evaluation | | 10.5 | 9.75 | 9.25 |
| Average marks | | 1.17 | 1.08 | 1.03 |
| Four colour print Epson Stylus Color 800 | | | | |
| Colour intensity | Magenta/ Yellow/Cyan | 1.25 | 1 | 0.75 |
| | Black | 1 | 1 | 0.75 |
| Dot sharpness | Black in colour | 1.25 | 1 | 1 |
| Transitions | Colour to colour | 1 | 1 | 1 |
| | Black to colour | 1 | 1 | 1 |
| Contours | | 1 | 1 | 1 |
| Print | | 1 | 1 | 1 |
| Halftone | | 1.25 | 1 | 1 |
| Photo quality | | 1 | 1 | 0.75 |
| Total evaluation | | 9.75 | 9 | 8.25 |
| Average mark | | 1.08 | 1.00 | 0.92 |

When using two different types of printer, the coating containing the dispersion with the longest dispersion time, according to example 2, produces the best results.

| | Colour densities | | |
|---|---|---|---|
| Dispersion used | Aluminium oxide dispersion acc. to example 2, 15 minutes' dispersion time | Aluminium oxide dispersion acc. to example 2, 30 minutes' dispersion time | Aluminium oxide dispersion acc. to example 2, 60 minutes' dispersion time |
| DIN HP 550 C Pap Pol Filter selected | | | |
| Paper white | 0 | 0 | 0 |
| Mean black | 2.33 | 2.36 | 2.42 |
| Mean yellow | 1.67 | 1.69 | 1.73 |
| Mean cyan | 2.33 | 2.35 | 2.39 |
| Mean magenta | 1.39 | 1.42 | 1.46 |
| Total | 7.72 | 7.82 | 8 |
| Epson Stylus Color 800 Pap Pol Filter selected | | | |
| Mean black | 3.07 | 3.08 | 3.14 |
| Mean yellow | 2.15 | 2.17 | 2.21 |
| Mean cyan | 3.23 | 3.25 | 3.33 |
| Mean magenta | 2.34 | 2.35 | 2.42 |
| Total | 10.79 | 10.85 | 11.1 |

When examining the colour densities, it can be seen that the coating containing the dispersion according to example 2 of the invention, with the longest dispersion time, reproduces the highest colour densities. This is desirable to obtain the most photo-realistic reproduction possible.

EXAMPLE 4

Production of an Inkjet Coating

Educts: aluminium oxide dispersion according to example 2 polyvinyl alcohol Mowiol 40-88 (Clariant)

Recipe and method for the production of Inkjet coating pigments:

The aqueous polyvinyl alcohol solution (Mowiol 40-88, Clariant) containing 12.14% solid matter is placed into a 400 ml beaker and a quantity of water is added so that, together with the aluminium oxide dispersions according to example 2, a solid content of 18% is obtained. The relevant dispersion is slowly dropped into the polyvinyl alcohol solution using a pipette, within 5 minutes, whilst stirring at 500 rpm. Once it has been added, stirring continues for a further 30 minutes at 500 rpm, to obtain a homogeneous coating pigment. The coating pigments are then de-aerated using a dessicator and a water jet pump. As a control, the actual solid matter, pH value and viscosity are determined after mixing the coating pigments.

The parts in the table below are understood to mean parts by weight in relation to the solid matter.

Coating Pigment Reference Values

| | | | |
|---|---|---|---|
| Aluminium oxide dispersion acc. to example 2, 15 minutes' dispersion time | 100 parts | | |
| Aluminium oxide dispersion acc. to example 2, 30 minutes' dispersion time | | 100 parts | |
| Aluminium oxide dispersion acc. to example 2, 60 minutes' dispersion time | | | 100 parts |
| PVA 40-88 | 18 parts | 18 parts | 18 parts |
| Actual solid content of the coating pigment in % | 18.01 | 18.04 | 18.02 |
| pH-value | 4.7 | 4.6 | 4.6 |
| Viscosity, Brookfield in mPa s after 24 h | | | |
| 5 rpm | 912 | 813 | 748 |
| 10 rpm | 846 | 697 | 664 |
| 20 rpm | 702 | 589 | 534 |
| 50 rpm | 535 | 496 | 462 |
| 100 rpm | 443 | 378 | 346 |
| Comments on production of coating pigments | good | good | good |

The viscosity data obtained show that the lowest viscosities are obtained with the dispersion according to example 2 and the longest dispersion time. This is desirable, as the solid matter in the coating pigment can be increased still further without obtaining viscosities that are too high for application.

Method for the production of an Inkjet coating from the Inkjet coating pigment referred to above.

Matt-coated 110 g/M$^2$ Inkjet paper (Zweckform no. 2576) is coated using an Erichsen Film Applicator device with a 60 micron wet film spiral applicator. The coating pigment applied is dried with a hot air dryer.

The coatings are then calendered three times at 10 bar pressure and 50° C. with a Gradek Oy (Trademark) laboratory calender.

Data for the Coatings Obtained

| | | | |
|---|---|---|---|
| Aluminium oxide dispersion acc. to example 2, 15 minutes' dispersion time | 100 parts | | |
| Aluminium oxide dispersion acc. to example 2, 30 minutes' dispersion time | | 100 parts | |
| Aluminium oxide dispersion acc. to example 2, 60 minutes' dispersion time | | | 100 parts |
| PVA 40-88 | 18 parts | 18 parts | 18 parts |
| Application behaviour | good | good | good |
| Average coating weight in g/m² and standard deviation* | 12.0 s = 0.4 | 11.9 s = 0.2 | 12.1 s = 0.3 |

*Note:
The printing tests were carried out with coatings of virtually the same coating weight.

| Coating properties | | | |
|---|---|---|---|
| Aluminium oxide dispersion acc. to example 2, 15 minutes' dispersion time | 100 parts | | |
| Aluminium oxide dispersion acc. to example 2, 30 minutes' dispersion time | | 100 parts | |
| Aluminium oxide dispersion acc. to example 2, 60 minutes' dispersion time | | | 100 parts |
| PVA 40-88 | 18 parts | 18 parts | 18 parts |
| Adhesion, surface and smoothness of the coating | Very good adhesion to the paper, homogeneous surface | Very good adhesion to the paper, homogeneous surface | Very good adhesion to the paper, homogeneous surface |
| Gloss at 20°/ standard deviation at n = 5 | 5.4 s = 0.4 | 5.9 s = 0.1 | 6.7 s = 0.3 |
| Gloss at 60°/ standard deviation at n = 5 | 24.6 s = 0.2 | 25.7 s = 0.3 | 26.2 s = 0.3 |

Discussion of the Gloss Values

The gloss values clearly show that, after 60 minutes' dispersion time, the dispersion according to the invention produces higher gloss values in the Inkjet coating than dispersions produced by other methods. For photo-realistic coatings, a high gloss is desirable as already disclosed in EP 0 732 219. The gloss values are lower than those in EP 0 732 219, but this is due to the different processes for the production of the Inkjet medium and not to the coating pigment. A spiral applicator is consciously used in this test, to determine the contribution of the dispersion in the Inkjet coating to the gloss. With the cast-coating process used in EP 0 732 219, the gloss is primarily determined by the process itself.

Printing test (determined by 3 independent persons) Top mark: 0.75 Bottom mark: 6

| Dispersion used | | Aluminium oxide dispersion acc. to example 2, 15 minutes' dispersion time | Aluminium oxide dispersion acc. to example 2, 30 minutes' dispersion time | Aluminium oxide dispersion acc. to example 2, 60 minutes' dispersion time |
|---|---|---|---|---|
| | | Four colour print Hewlett-Packard 550 C | | |
| Colour intensity | Magenta/Yellow/Cyan | 1.25 | 1.25 | 1 |
| | Black | 1.25 | 1.25 | 1 |
| Dot sharpness | Black in colour | 1.5 | 1.25 | 1.25 |
| Transitions | Colour to colour | 1 | 1 | 1 |
| | Black to colour | 1 | 1 | 1 |
| Contours | | 1 | 1 | 1 |
| Print | | 1.25 | 1.25 | 1 |
| Halftone | | 1.25 | 1 | 1 |
| Photo quality | | 1.5 | 1.25 | 1.25 |
| Total evaluation | | 11 | 10.25 | 9.5 |
| Average mark | | 1.22 | 1.08 | 1.06 |
| | | Four colour print Epson Stylus Color 800 | | |
| Colour intensity | Magenta/Yellow/Cyan | 1.5 | 1.25 | 1 |
| | Black | 1 | 1 | 1 |
| Dot sharpness | Black in colour | 1.5 | 1.25 | 1.25 |
| Transitions | Colour to colour | 1.25 | 1.25 | 1 |
| | Black to colour | 1 | 1 | 1 |
| Contours | | 1 | 1 | 1 |
| Print | | 1 | 1 | 1 |
| Halftone | | 1.25 | 1 | 1 |
| Photo quality | | 1.5 | 1.25 | 1.25 |
| Total evaluation | | 11 | 10 | 9.5 |
| Average mark | | 1.22 | 1.11 | 1.06 |

When using two different types of printer, the coating containing the dispersion with the longest dispersion time according to example 2, produces the best results.

| Dispersion used | Colour densities | | |
|---|---|---|---|
| | Aluminium oxide dispersion acc. to example 2, 15 minutes' dispersion time | Aluminium oxide dispersion acc. to example 2, 30 minutes' dispersion time | Aluminium oxide dispersion acc. to example 2, 60 minutes' dispersion time |
| DIN HP 550 C Pap Pol Filter selected | | | |
| Paper white | 0 | 0 | 0 |
| Mean black | 2.05 | 2.10 | 2.13 |
| Mean yellow | 1.49 | 1.54 | 1.58 |
| Mean cyan | 2.04 | 2.07 | 2.11 |
| Mean magenta | 1.28 | 1.32 | 1.35 |
| Total | 6.86 | 7.03 | 7.17 |
| DIN Epson Stylus Color 800 Pap Pol Filter selected | | | |
| Mean black | 2.89 | 2.96 | 2.98 |
| Mean yellow | 1.92 | 1.97 | 2.04 |
| Mean cyan | 2.96 | 3.03 | 3.09 |
| Mean magenta | 2.13 | 2.25 | 2.31 |
| Total | 9.9 | 10.21 | 10.42 |

When examining the colour densities, it can be seen that the coating containing the dispersion according to example 2 of the invention with the longest dispersion time reproduces the highest colour densities. This is desirable to obtain the most photo-realistic reporoduction possible.

The dispersion according to the invention is eminently suitable for the production of Inkjet coating pigments and their further processing to produce high-gloss printing media, as can be seen from the examples given. The Inkjet media produced in this way have a particularly good print and gloss quality.

The invention claimed is:

1. A process for the production of aluminium oxide dispersions, comprising mixing a high-surface-area, pyrogenically-produced aluminium oxide, having a BET specific surface area of more than 115 $m^2/g$ and a Sears number of more than 8 ml/2 g, with water and one or more of the components selected from the group consisting of inorganic acids, organic acids, inorganic bases, organic bases, salts, buffer systems, ionic surfactants, non-ionic surfactants, polyelectrolytes, polymers, dispersing agents, stabilizers and biocides, setting a pH value of 2 to 8 with acid, and subjecting the mixture to controlled shearing forces for a period of about 45 minutes or more sufficient to form a dispersion havng a mean particle size distribution of $d_{50}<150$ nm.

2. The process for the production of aluminium oxide dispersions according to claim 1, wherein the mixture is subject to controlled shearing forces in shearing equipment including rotor-stator machines, ball mills, pearl mills and agitated ball mills.

3. The process of claim 1, wherein the mean particle size distribution of d50 has a value that falls within the range of 139 and 130 nm.

* * * * *